No. 685,473. Patented Oct. 29, 1901.
B. B. HILL.
APPARATUS FOR FORMING BANDS.
(Application filed Feb. 2, 1901.)
(No Model.) 2 Sheets—Sheet 1.
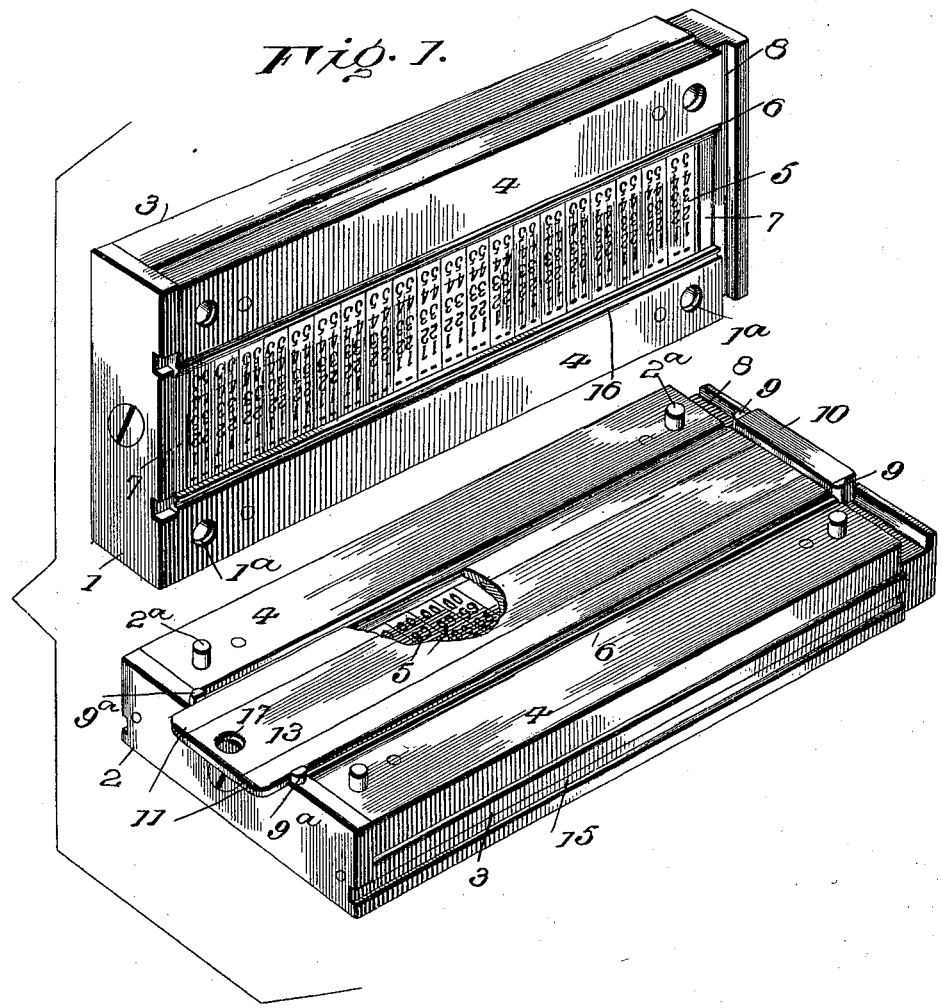

No. 685,473. Patented Oct. 29, 1901.
B. B. HILL.
APPARATUS FOR FORMING BANDS.
(Application filed Feb. 2, 1901.)
(No Model.) 2 Sheets—Sheet 2.
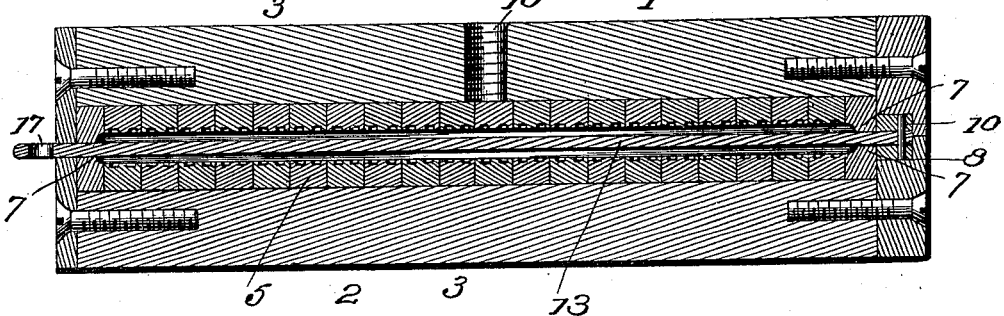
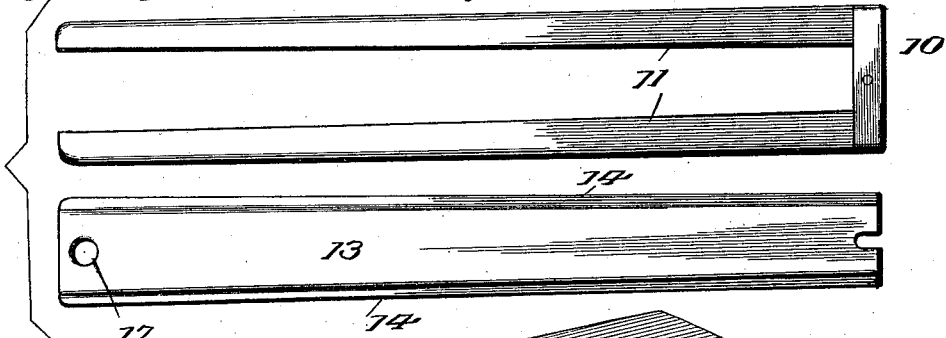
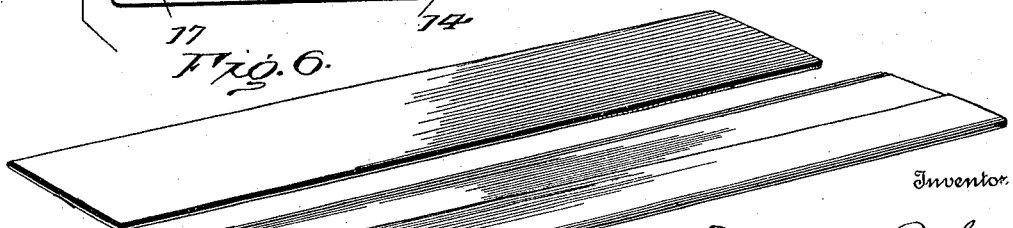
Witnesses Inventor
Benjamin B. Hill
By Thos. E. Robertson, Attorney

UNITED STATES PATENT OFFICE.

BENJAMIN B. HILL, OF PHILADELPHIA, PENNSYLVANIA.

APPARATUS FOR FORMING BANDS.

SPECIFICATION forming part of Letters Patent No. 685,473, dated October 29, 1901.

Application filed February 2, 1901. Serial No. 45,736. (No model.)

*To all whom it may concern:*

Be it known that I, BENJAMIN B. HILL, a citizen of the United States, residing at Philadelphia, in the county of Philadelphia, State of Pennsylvania, have invented a certain new and useful Improvement in Apparatus for Forming Bands, of which the following is a specification, reference being had to the accompanying drawings.

This invention relates to an improvement in apparatus for forming and molding endless rubber bands especially adapted for use in dating and numbering stamps, where it is necessary to have endless bands of unvarying size or diameter with raised printing characters on their surfaces. The bands as heretofore manufactured have been defective in varying slightly in size, which is objectionable for obvious reasons. To overcome this defect is the object of the present invention, which is accomplished by vulcanizing the bands while in a stretched condition, so that the bands not only do not vary in size, but as they are stretched in their manufacture they cannot stretch to any appreciable extent in their every-day use afterward.

With this object in view my invention consists in the peculiar construction, arrangement, and combinations of parts hereinafter more particularly described and then definitely pointed out in the claims at the end hereof.

In the accompanying drawings, which represent what I now believe to be the preferable embodiment of my invention, Figure 1 is a perspective view of the different parts of the apparatus, showing the two sections of the mold slightly separated in order to show how they are to be fitted together. Fig. 2 is a vertical cross-section of the same with a "band" therein. Fig. 3 is a longitudinal section. Fig. 4 is a perspective view of the adjustable or expansible "former." Fig. 5 is a top plan of the parts of the former separated. Figs. 6 and 7 are details of the parts forming the band.

Referring now to the details of the drawings by numerals, 1 and 2 represent the two halves of the mold, the lower half 2 having lugs or pins $2^a$ projecting therefrom and entering the coinciding openings $1^a$ in the upper half 1. The said halves 1 and 2 are each formed of a base 3, to which are secured by screws or analogous means the side plates 4, and in the wide opening left between these side plates are situated the molds 5, which are made up of a number of plates held in position by overlapping flanges $4^a$, (see Fig. 2,) projecting from the side plates 4. It will be noticed that this construction of side plates 4 and the molding-plates held between them form a long channel or groove in which the bands are formed, the plates 5 forming the molds and also forming the bottom of this channel or groove. In these plates are formed the characters to be reproduced on the printing-bands, in the present instance the characters being numbers which run from "1" to "5," inclusive, on the upper half 1 and from "6" to "0" on the lower half 2, though of course my invention is adapted to other numbers or letters, the ones shown being those formed on bands used for printing numbers in dating-stamps. Running lengthwise of each mold and on each side of the wide grooves or channels are narrow supplemental grooves 6, the purpose of which will be hereinafter explained. At each end of each half of the mold is a slightly-raised portion 7, (see Fig. 3,) which raised portions are of the proper height to hold the former (to be described) the proper distance above the characters to afford a space for containing the fabric and rubber during the vulcanizing process. At the opposite end of each part of the mold is a transverse groove 8, the lower mold 1 having two upwardly-projecting lugs 9 in its groove 8 and similar lugs $9^a$ at the opposite end, which form a means of holding the head of the former in position, as will appear later.

My adjustable former is illustrated in perspective detail in Fig. 4 and consists of a head 10, having projecting therefrom the two arms 11, which are grooved, as seen at 12, and a sliding member 13, which is formed with tongues 14, adapted to closely fit the aforesaid grooves and allow the member to slide therein. It will be observed that this sliding member is in reality a wedge—that is, it is made narrower at one end than at the other—so that when it is inserted in position between the arms 11 it will wedge or force them slightly apart, and I shall therefore hereinafter call this sliding member a "wedge."

The head 10 of this former is properly proportioned to fit within the transverse grooves 8, hereinbefore described.

One section of the mold is preferably provided with grooves 15 and the other section with a screw-threaded opening or openings 16, by which the sections of the mold may be properly handled with tools while hot. The wedge of the former is also provided with a perforation 17, with which a properly-shaped tool may be engaged to withdraw the wedge from the former when the parts are too hot to be comfortably handled without tools.

The operation of my apparatus is as follows: A sheet of unvulcanized rubber cut to the proper size (see Fig. 6) is placed in the lower section 1 of the mold. A piece of fabric which has been formed into a long endless band, as seen in Fig. 7, by cementing its edges is then placed over the adjustable or expansible former, the wedge having been first withdrawn. This fabric is of such a size as to be slipped on the former when the latter is not expanded, and when the wedge is inserted in the former the arms 11 are expanded laterally, thus stretching the fabric to the desired extent. The expanded former, with its fabric covering, is now placed on the lower section of the mold on top of the sheet of unvulcanized rubber, which has already been placed in position. A similar sheet of rubber is then placed on top of the expanded former, when the top section 2 of the mold can be placed or fitted in position, the expanded former, with its fabric covering and the sheets of rubber on each side, being held within the wide grooves or channels between the two parts of the mold. The mold, with its contained material, is then introduced in the vulcanizing-press (which is unnecessary to here illustrate) and subjected to the usual vulcanizing process, and after vulcanization it will be found that the endless fabric and the two sheets of rubber now form one integral endless band, which has been stretched in the process of manufacture by means of the expanding former, and therefore all the bands must be of uniform size and practically unstretchable afterward. To withdraw the former from the completed article, it is first necessary to withdraw the wedge, and then the article can be slipped off of the arms of the former. When the article is withdrawn, there may be a slight ridge formed on each edge where the molds come together, and it is sometimes necessary to trim this off, although as this ridge is only hair-like in structure it can be left on, if desired. If the sheets should be a little too wide before vulcanizing, the surplus is squeezed into the grooves 6, although by taking great care in placing the sheets in position and in having them of the exact shape needed the grooves could be dispensed with.

It is manifest that I have produced an apparatus for forming endless bands which are a great improvement over the bands as now made, inasmuch as the bands of necessity are of the same or standard size, as they are made, it might be said, under "inward pressure," for the reason that they have been expanded or stretched by the former to the proper extent before vulcanization. The product of my apparatus is for this reason a most superior article and is a great improvement on the bands formed by the present methods.

It is obvious that changes and modifications may be made in my apparatus without departing from the spirit of my invention, and I therefore intend the following claims to cover all such variations and modifications as naturally fall within its scope. It is obvious, for instance, that instead of providing a groove in each part of the mold a sufficiently deep groove could be formed in one of the parts and the companion part could be substantially flat.

It is evident that instead of making the molds 5 of a series of plates they may be made in the form of a continuous plate held in position by the flanges 4ª, projecting from the side plates 4.

What I claim as new is—

1. In apparatus for forming bands; a two-part mold having an opening formed between the two parts, in combination with an expansible former arranged to coact with said molds, substantially as described.

2. In apparatus for forming bands, a two-part mold having an opening formed between the two parts, and an expansible former coacting therewith, the said parts being formed with means for separating the former from the mold, and thereby leave a space for the article being vulcanized, substantially as described.

3. In apparatus for forming bands, a mold formed of two parts each having a channel or groove therein, in combination with an expansible former arranged to coact with said channels or grooves, substantially as described.

4. In apparatus for forming bands, a two-part mold having an opening formed between the two parts, a former arranged to coact with said opening, a transverse groove in said mold, and a head on said former fitting said groove and thereby holding the former in its proper position, substantially as described.

5. In apparatus for forming bands, a mold formed of two parts having an opening between them and arranged with characters therein, and a former coacting with said opening and arranged to stretch a band while being formed within the mold, substantially as described.

6. In apparatus for forming bands, a mold formed of two parts having an opening between them, and an expansible former coacting with said opening and comprising a wedge arranged to expand the body of said former, substantially as described.

7. In apparatus for forming bands, a mold formed of two parts having an opening between them, and an expansible former coacting with said opening and comprising a pair of arms and a wedge arranged to expand said arms, substantially as described.

8. In apparatus for forming bands, a mold formed of two parts having an opening between them, and an expansible former coacting with said opening and comprising a head and arms and a wedge sliding between said arms and arranged to expand the same, substantially as described.

9. In apparatus for forming bands, a mold formed of two parts having an opening between them, and an expansible former coacting with said opening and comprising a head and arms and a wedge sliding in said arms, the said arms and wedge being tongue-and-grooved so as to be flush on their outer surfaces, substantially as described.

10. In apparatus for forming bands, a mold comprising a base, side plates secured thereto and a molding-plate secured between said side plates, the said side plates having overhanging flanges securing the molding-plate in position, substantially as described.

11. In apparatus for forming bands, a mold comprising a base having side plates secured thereto, and a series of plates having characters formed therein; the side plates having flanges securing the series of plates in position, substantially as described.

In testimony whereof I affix my signature, in the presence of two witnesses, this 29th day of January, 1901.

BENJAMIN B. HILL.

Witnesses:
 JOHN M. SNYDER,
 ELWOOD WINTERBOTTOM.